United States Patent [19]

Mitsutake et al.

[11] Patent Number: 5,690,772

[45] Date of Patent: Nov. 25, 1997

[54] METHOD FOR MASS-PRODUCING ECCENTRIC FRESNEL LENS SHEETS

[75] Inventors: Hideaki Mitsutake, Tokyo; Nobuo Minoura, Yokohama; Katsumi Kurematsu, Kawasaki; Haruyuki Yanagi, Yokohama, all of Japan

[73] Assignee: Canon Kabushiki Kaisha, Tokyo, Japan

[21] Appl. No.: 268,870

[22] Filed: Jun. 30, 1994

Related U.S. Application Data

[63] Continuation of Ser. No. 662,769, Feb. 28, 1991, abandoned.

[30] Foreign Application Priority Data

Mar. 2, 1990 [JP] Japan .................................. 2-049429

[51] Int. Cl.⁶ .................................................. B32B 31/00
[52] U.S. Cl. ........................ 156/253; 156/250; 156/260; 353/75; 353/76; 353/78; 353/38; 359/443; 359/448; 359/454; 359/457; 359/459; 359/741; 359/742; 359/743
[58] Field of Search ........................ 156/253, 259, 156/260, 250; 350/452, 168, 322, 117, 122, 123, 124, 125; 353/74, 75, 76, 79, 77, 78, 38; 359/615, 900, 443, 448, 454, 460, 741, 742, 743, 487, 459

[56] References Cited

U.S. PATENT DOCUMENTS 2,441,747  5/1948  Beshgetoor ............................. 76/197
3,972,593  8/1976  Appeldorn et al. .................. 350/276 R
3,982,822  9/1976  Condor et al. ........................ 350/211
4,391,495  7/1983  Mazurkewitz ........................ 350/452
4,439,027  3/1984  Shioda et al. ........................ 353/77
4,482,206  11/1984  Van Breemen ...................... 350/128
4,573,121  2/1986  Saigo et al. .......................... 364/413
4,674,836  6/1987  Yates et al. .......................... 350/128

FOREIGN PATENT DOCUMENTS 692569  6/1953  United Kingdom .

*Primary Examiner*—Merrick Dixon
*Attorney, Agent, or Firm*—Morgan & Finnegan LLP

[57] ABSTRACT

A method for mass-producing eccentric Fresnel lens sheets comprising the steps of: preparing a number of concentric Fresnel lens sheets; dividing the concentric Fresnel lens sheets into a first set and a second set each including a plurality of Fresnel lens sheets; cutting out a plurality of first sheets each corresponding to one portion of the eccentric Fresnel lens sheet from each of the Fresnel lens sheets of the first set; cutting out a plurality of second sheets each corresponding to the other portion of the eccentric Fresnel lens sheet from each of the Fresnel lens sheets of the second set; and bonding each of the first sheets and each of the second sheets in such a manner that patterns on the first sheet and the second sheet are continuous to prepare a plurality of eccentric Fresnel lens sheet. The second set can include a third set and a fourth set and a plurality of third sheets are cut out from the third set and a plurality of fourth sheets are cut out from the fourth set. The third sheets and fourth sheets are bonded to the first sheets. The first sheets are relatively large rectangular sheets and the second sheets are small rectangular sheets.

21 Claims, 5 Drawing Sheets

METHOD FOR MASS-PRODUCING ECCENTRIC FRESNEL LENS SHEETS

This is a continuation of application Ser. No. 07/662,769, filed on Feb. 28, 1994, now abandoned, Aug. 5, 1994.

BACKGROUND OF THE INVENTION

1. Field of the Invention

The present invention relates to a method for mass-producing eccentric Fresnel lens sheets to be used as screens of a projection type image display device.

2. Related Background Art

A projection type image display device includes a vertical incidence system in which an incident angle of an image light to a center of a screen is 0° as disclosed in TELEVISION TECHNOLOGY, published by Denshi Gijutsu Publishing Co., Vol. 34, pages 19-35, November 1986, and an oblique incidence system in which the incident angle is not 0°, as disclosed in Japanese Laid-Open Patent Application No. 57-109481.

FIG. 5 shows a prior art rear projection type image display device of the oblique incidence system.

The rear projection type image display device comprises a cabinet 100, a screen 101 arranged in front of the cabinet 100 to display an image, a first mirror 102 made of a surface mirror having a reflection factor of 90 to 100% disposed on an inner top plane of the cabinet 100, a second mirror 103 made of a surface mirror having a reflection factor of 90 to 100% disposed on an inner rear plane of the cabinet 100, a CRT 104 accommodated at a bottom of the cabinet 100 for generating an image light, and a projection lens 105 for magnifying the image light and projecting it toward the first mirror 102.

The image light generated by the CRT 104 is magnified by the projection lens 105, directed to the first mirror 102, reflected by the first mirror 102 and directed to the second mirror 103. The image light directed to the second mirror 103 is reflected by the second mirror 103 and directed to the screen 101. As shown in FIG. 5, an incident angle $\theta_0$ of the image light to the center of the screen 101 is set by the second mirror 103 to not 0° but a certain angle. As a result, the depth of the cabinet 100 may be reduced. Accordingly, the rear projection type image display device attains the compactness.

Usually, the screen used in the rear projection type image display device comprises two sheets, namely, a Fresnel lens sheet having a focusing function and having concentric prisms formed on one surface, and a diffusion plate having diffuser introduced therein or a longitudinal lenticular lens sheet which improves a lateral viewing characteristic of the screen. In the rear projection type image display device of the vertical incidence system, the incident angle $\theta_0$ of the image light to the center of the screen is 0° as described above. Therefore, the concentric Fresnel lens sheet having the center of the sheet coincident to the center of the Fresnel lens is used. On the other hand, in the rear projection type image display device of the oblique incidence system shown in FIG. 1, the incident angle $\theta_0$ of the image light to the center of the screen is not 0° as described above. Thus, when the concentric Fresnel lens sheet is used, the image light is directed downward of the screen and a brightness at a view point of a viewer (which is substantially as high as the center of the screen) is lowered. Accordingly, in the oblique incidence system, an eccentric Fresnel lens sheet in which the center of the Fresnel lens sheet is located at an outer lower portion of the sheet is used to condense the image light to the view point of the viewer.

To manufacture the eccentric Fresnel lens sheet, a compression molding method which uses a press machine and a mold is usually employed.

Where the eccentric Fresnel lens sheet having the center thereof deviated to the lower outer portion of the sheet is manufactured by the compression molding method, a mold which is of asymmetric shape in the eccentricity direction is needed and a cost to manufacture the mold increases. As a result, the eccentric Fresnel lens sheet requires a higher manufacturing cost than that of the concentric Fresnel lens sheet which can be manufactured by a mold of a symmetric shape.

SUMMARY OF THE INVENTION

It is an object of the present invention to provide a method for mass-producing eccentric Fresnel lens sheet to permit reduction of a manufacturing cost.

In order to achieve the above object, a mass-production method in a first aspect of the present invention comprises the steps of: preparing a number of concentric Fresnel lens sheets; dividing the concentric Fresnel lens sheets into a first set and a second set each including a plurality of Fresnel lens sheets; cutting out a plurality of first sheets each corresponding to one portion of the eccentric Fresnel lens sheet from each of the Fresnel lens sheets of the first set; cutting out a plurality of second sheets each corresponding to the other portion of the eccentric Fresnel lens sheet from each of the Fresnel lens sheets of the second set; and bonding each of the first sheets and each of the second sheets in such a manner that patterns on the first sheet and the second sheet are continuous to prepare a plurality of eccentric Fresnel lens sheet.

A mass-production method in a second aspect of the present invention comprises the steps of: preparing a number of concentric Fresnel lens sheets having the same Fresnel lens formed therein by using a mold of a concentric Fresnel lens; dividing the concentric Fresnel lens sheets into a first set having a plurality of Fresnel lens sheets and a second set having a smaller plurality of Fresnel lens sheets than that of the first set; cutting out a plurality of relatively large first sheets each corresponding to one portion of the eccentric Fresnel lens sheet from each of the Fresnel lens sheets of the first set in such a manner that each of the first sheets does not contain a center of lens of the concentric Fresnel lens sheet; cutting out a larger plurality of second sheets than that of the first sheets each corresponding to the other portion of the eccentric Fresnel lens sheet from each of the Fresnel lens sheets of the second set in such a manner that each of the second sheets does not contain the center of lens of the concentric Fresnel lens sheet; and bonding each of the first sheets and each of the second sheets in such a manner that patterns of the first sheet and the second sheet are continuous to prepare a plurality of eccentric Fresnel lens sheets.

Further, a mass-production method in a third aspect of the present invention comprises the steps of: preparing a number of concentric Fresnel lens sheets having the same Fresnel lens formed therein by using a mold of a concentric Fresnel lens; dividing the concentric Fresnel lens sheets into a first set having a plurality of Fresnel lens sheets and a second set having a smaller plurality of Fresnel lens sheets than that of the first set; cutting out a plurality of relatively large first sheets each corresponding to one portion of the eccentric Fresnel lens sheet from each of the Fresnel lens sheets of the first set in such a manner that each of the first sheets does not contain a center of lens of the concentric Fresnel lens sheet and the sheets are of substantially same shape and dimension to each other; cutting out a larger plurality of second sheets than that of the first sheets each corresponding to the other portion of the eccentric Fresnel lens sheet from each of the Fresnel lens sheets of the second set in such a manner that each of the second sheets does not contain the center of lens of the concentric Fresnel lens sheet and the sheets are of substantially same shape and dimension to each other; and bonding each of the first sheets and each of the second sheets in such a manner that patterns of the first sheet and the second sheet are continuous to prepare a plurality of eccentric Fresnel lens sheets.

In the first to third aspects, in one modification, the second set is divided into a third set and a fourth set. A plurality of second sheets and one sheet are cut out from each of the concentric Fresnel lens sheets of the third set, and a plurality of second sheets and other sheet are cut out from each of the concentric Fresnel lens sheets of the fourth set. The one sheet and the other sheet are bonded in such a manner that patterns of both sheets are continuous to form the second sheet. Usually, the one sheet is the relatively large second sheet having a portion thereof lost, and the other sheet is a relatively small sheet which corresponds to said portion of the second sheet. In another modification, the second set is divided into the third set and the fourth set. A plurality of third sheets each corresponding to one portion of the eccentric Fresnel lens sheet are cut out from the third set, and a plurality of fourth sheets each corresponding to the other portion of the eccentric Fresnel lens sheet are cut out from the fourth set. The third and fourth sheets are bonded to the first sheets, respectively.

In the mass-production method of the present invention, four or more first sheets are cut out from each of the Fresnel lens sheets of the first set, and five or more second sheets are cut out from each of the Fresnel lens sheets of the second set.

In the mass-production method of the eccentric Fresnel lens sheets of the present invention, since the eccentric Fresnel lens sheets are manufactured from the concentric Fresnel lens sheets, a mold for the compression molding manufacturing process may have the concentric Fresnel pattern formed therein. Since the first and second sheets cut out from two concentric Fresnel lens sheets are bonded to prepare the eccentric Fresnel lens sheet, the shapes of the first sheet and the second sheet may be of any shape so long as a lack portion of the first sheet as the eccentric Fresnel sheet is complemented by the second sheet. Accordingly, the shapes and dimensions of the first sheets and the second sheets may be selected to reduce the cut loss of the concentric Fresnel lens sheets in order to reduce the manufacturing cost of the eccentric Fresnel lens sheets.

The second sheet may be the third sheet having a portion of the second sheet lost and cut out from an unused area of one concentric Fresnel lens sheet, bonded with the fourth sheet having a shape to complement the lost portion of the third sheet and cut out from an unused area of another concentric Fresnel lens sheet. In this case, more first and second sheets may be prepared from two concentric Fresnel lens sheets and the cut loss of the concentric Fresnel lens sheets is further reduced.

BRIEF DESCRIPTION OF THE DRAWINGS

FIG. 1 shows a method for manufacturing an eccentric Fresnel lens sheet in one embodiment of the present invention, in which FIG. 2 shows a method for manufacturing an eccentric Fresnel lens sheet in a second embodiment of the present invention, in which FIG. 3 shows a method for manufacturing an eccentric Fresnel lens sheet in the second embodiment of the present invention, in which FIG. 4 shows a method for manufacturing an eccentric Fresnel lens sheet in a third embodiment of the present invention, in which

DETAILED DESCRIPTION OF THE PREFERRED EMBODIMENTS

The preferred embodiments of the present invention are now explained with reference to the drawings.

Figure 1A:
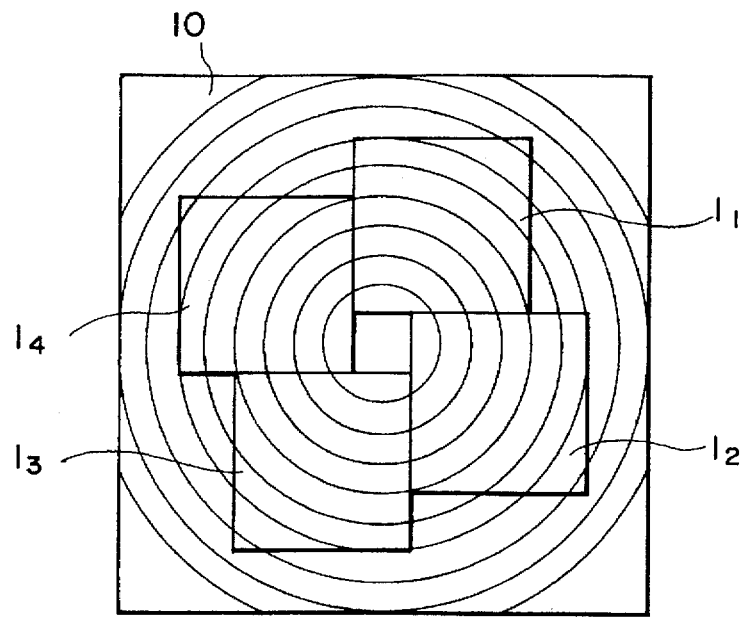
FIG. 1A shows a method for cutting out first sheets $1_1$ to $1_4$.
Figure 1B:
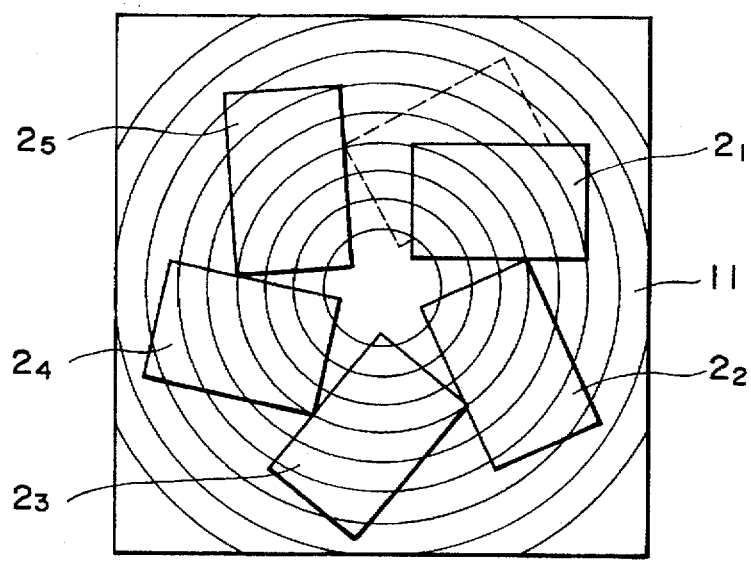
FIG. 1B shows a method for cutting out second sheets $2_1$ to $2_5$.
Figure 1C:
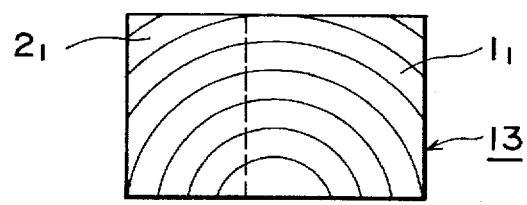
FIG. 1C shows a method for manufacturing an eccentric Fresnel lens sheet 13.

FIGS. 1A, 1B and 1C show a method for manufacturing an eccentric Fresnel lens sheet in a first embodiment of the present invention.

In the method for manufacturing the eccentric Fresnel lens sheet of the present embodiment, an eccentric Fresnel lens sheet 13 shown in FIG. 1C is manufactured in the following manner.

(1) Two concentric Fresnel lens sheets (a first concentric Fresnel lens sheet 10 and a second concentric Fresnel lens sheet 11) each having the center of the sheet aligned to the center of the Fresnel lens sheet are manufactured by a known compression molding method which uses a press machine and a mold.

(2) As shown in FIG. 1A, four first sheets $1_1$ to $1_4$ of the same dimension each being of a rectangular shape having one side which is equal in length to a shorter side of the eccentric Fresnel lens sheet 13 and having corresponding corners thereof located on concentric circles, are cut out from the first concentric Fresnel lens sheet 10 by a cutter.

(3) As shown in FIG. 1B, five second sheets $2_1$ to $2_5$ of the same dimension each being of a rectangular shape having a longer side which is equal in length to the shorter side of the eccentric Fresnel lens sheet 13 and a shorter side, a sum of which shorter side and a length of a side of the first sheets $1_1$ to $1_4$ which is not equal to the shorter side of the eccentric Fresnel lens sheet 13 is equal in length to a longer side of the eccentric Fresnel lens sheet 13, and having corresponding corners thereof located on concentric circles, are cut out from the second concentric Fresnel lens sheet 11 in the same manner as the first sheets $1_1$ to $1_4$.

(4) As shown in FIG. 1C, the four first sheets $1_1$ to $1_4$ and four of the second sheets $2_1$ to $2_5$ are bonded by bond means such as adhesive material at the sides of equal length such that the Fresnel lens patterns are continuous to form four eccentric Fresnel lens sheets 13.

(5) The steps (1) to (4) are repeated to other pairs of concentric Fresnel lens sheets.

When the eccentric Fresnel sheets 13 are cut out directly from the first concentric Fresnel sheet 10 and the second concentric Fresnel sheet 11, four Fresnel lens sheets 13 are produced. In the present embodiment, however, since five second sheets $2_1$ to $2_5$ are cut out from the second concentric Fresnel sheet 10, a larger number of eccentric Fresnel lens sheets 13 may be produced from a predetermined number of first concentric Fresnel lens sheets 10 and a smaller number of second concentric Fresnel lens sheets 11 when the eccentric Fresnel lens sheets 13 are mass-produced. For example, 20 eccentric Fresnel lens sheets 13 may be produced from five sheets 10 and four sheets 11. Further, since the concentric Fresnel lens sheets are manufactured by the compression molding method, the manufacture is easy and the manufacturing cost does not rise.

Figure 2A:
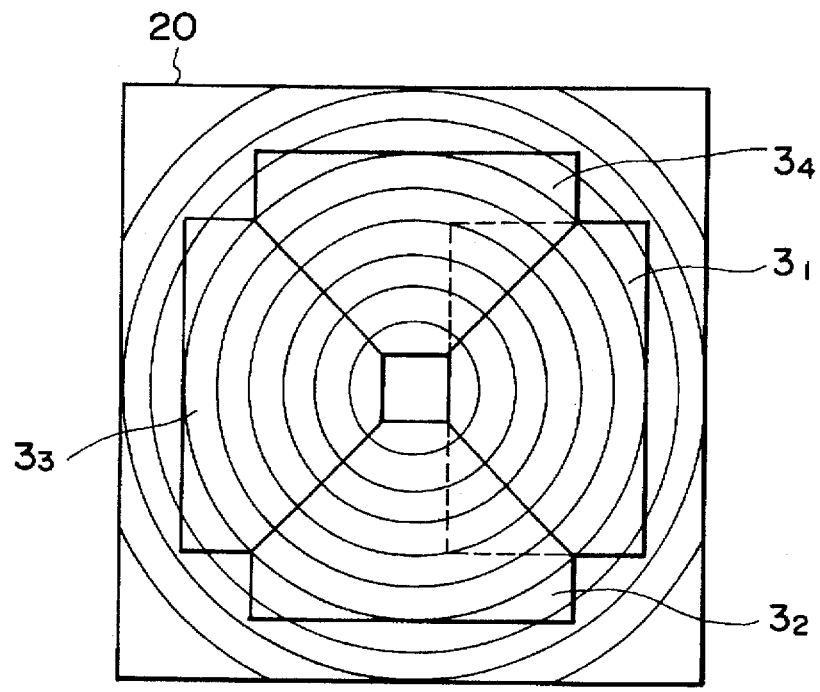
FIG. 2A shows a method for cutting out first sheets $3_1$ to $3_4$.
Figure 2B:
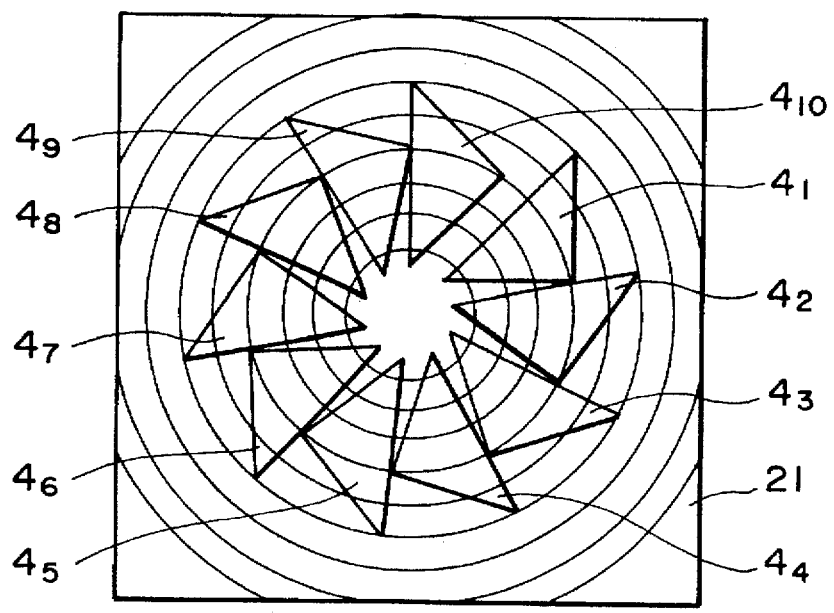
FIG. 2B shows a method for cutting out second sheets $4_1$ to $4_{10}$.
Figure 3A:
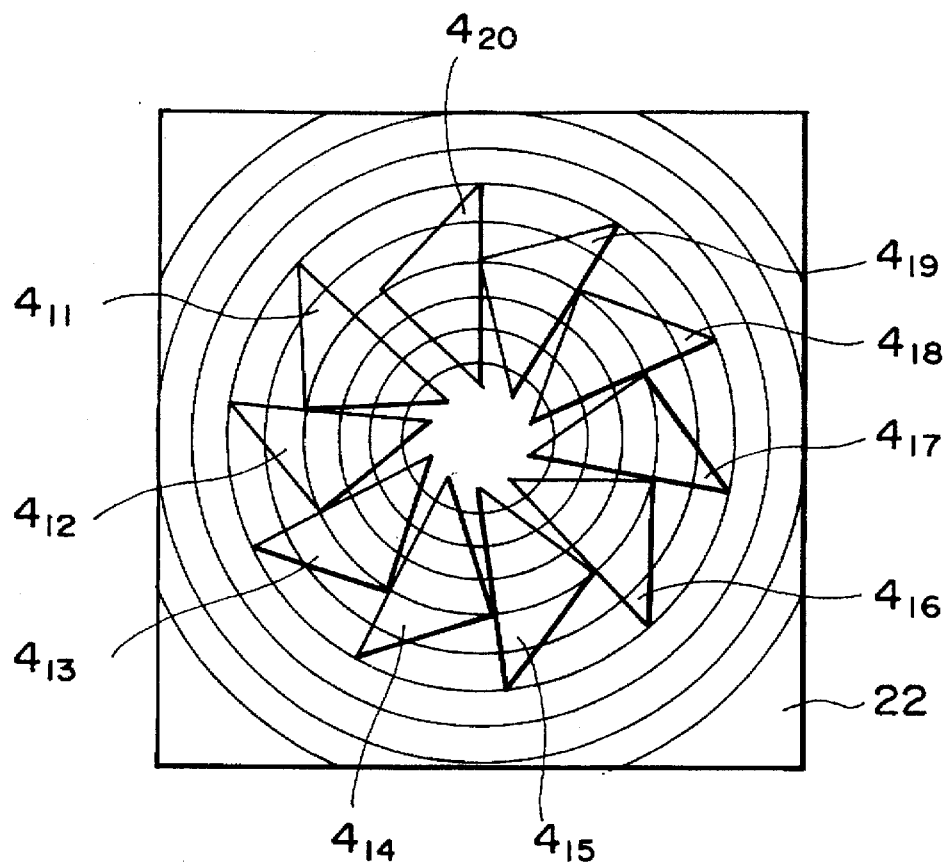
FIG. 3A shows a method for cutting out third sheets $4_{11}$ to $4_{20}$.
Figure 3B:
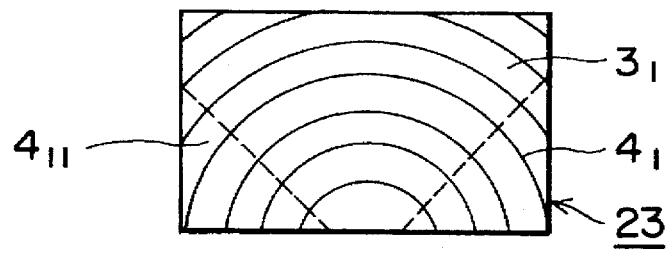
FIG. 3B shows a method for manufacturing an eccentric Fresnel lens sheet 23.

FIGS. 2A and 2B and FIGS. 3A and 3B show a second embodiment of the method for manufacturing the eccentric Fresnel lens sheet of the present invention. In the method for manufacturing the eccentric Fresnel lens sheets of the present embodiment, an eccentric Fresnel lens sheet 23 shown in FIG. 3B is manufactured in the following manner.

(1) Four or more concentric Fresnel lens sheets (for example, two first concentric Fresnel lens sheets 20, one second concentric Fresnel lens sheets 21 and one third concentric Fresnel lens sheet 23) each having the center of the sheet aligned to the center of the Fresnel lens sheet are manufactured by a known compression molding method which uses a press machine and a mold.

(2) As shown in FIG. 2A, four first sheets $3_1$ to $3_4$ of the same dimension and same shape each having portions thereof which overlap when the eccentric Fresnel lens sheets 23 are arranged symmetrically both vertically and horizontally (portions shown by broken lines in FIG. 2A for the first sheet $3_1$), cut away are cut out from each of the first concentric Fresnel lens sheet 20 by cut means such as a cutter.

(3) As shown in FIG. 2B, ten second sheets $4_1$ to $4_{10}$ of the same dimension each being of triangular shape to complement one of the cut-away portions of the first sheets $3_1$ to $3_4$ and having corresponding corners located on concentric circles, are cut out from the second concentric Fresnel lens sheet 21 in the same manner as the first sheets $3_1$ to $3_4$.

(4) As shown in FIG. 3A, ten third sheets $4_{11}$ to $4_{20}$ of the same dimension each being of triangular shape to complement the other of the cut-away portions of the first sheets $3_1$ to $3_4$ and having corresponding corners located on concentric circles are cut out from the third concentric Fresnel lens sheet 22, in the same manner as the first sheets $3_1$ to $3_4$.

(5) As shown in FIG. 3B, four first sheets $3_1$ to $3_4$, four of the second sheets $4_1$ to $4_{10}$ and four of the third sheets $4_{11}$ to $4_{20}$ are bonded by bond means such as adhesive material such that the second sheet $4_1$ and the third sheet $4_{11}$ complement the cut-away portions of the first sheet $3_1$ to form four eccentric Fresnel lens sheets 23.

(6) The remaining second and third sheets are combined with the first sheets cut out from other concentric Fresnel lens sheets 20 to prepare eccentric Fresnel lens sheets.

(7) Steps (1) to (6) are repeated for the sheets 20, 21 and 23.

Figure 4A:
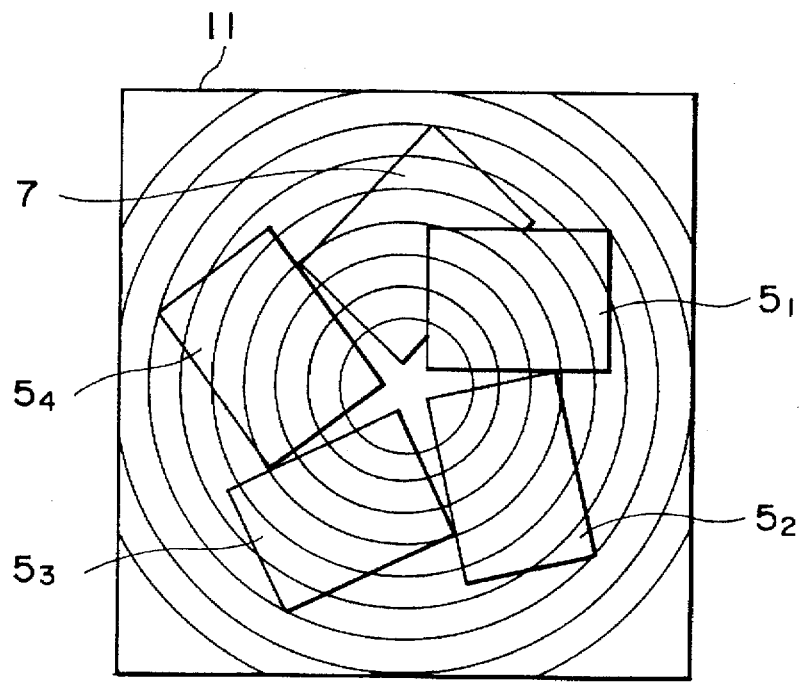
FIG. 4A shows a method for cutting out second sheets $5_1$ to $5_5$.
Figure 4B:
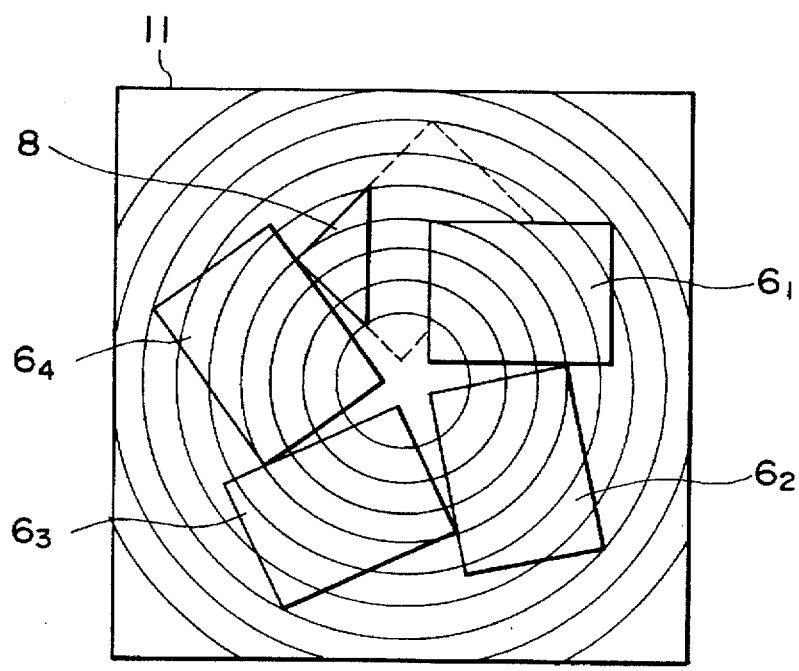
FIG. 4B shows another method for cutting out second sheets $6_1$ to $6_5$.
Figure 5:
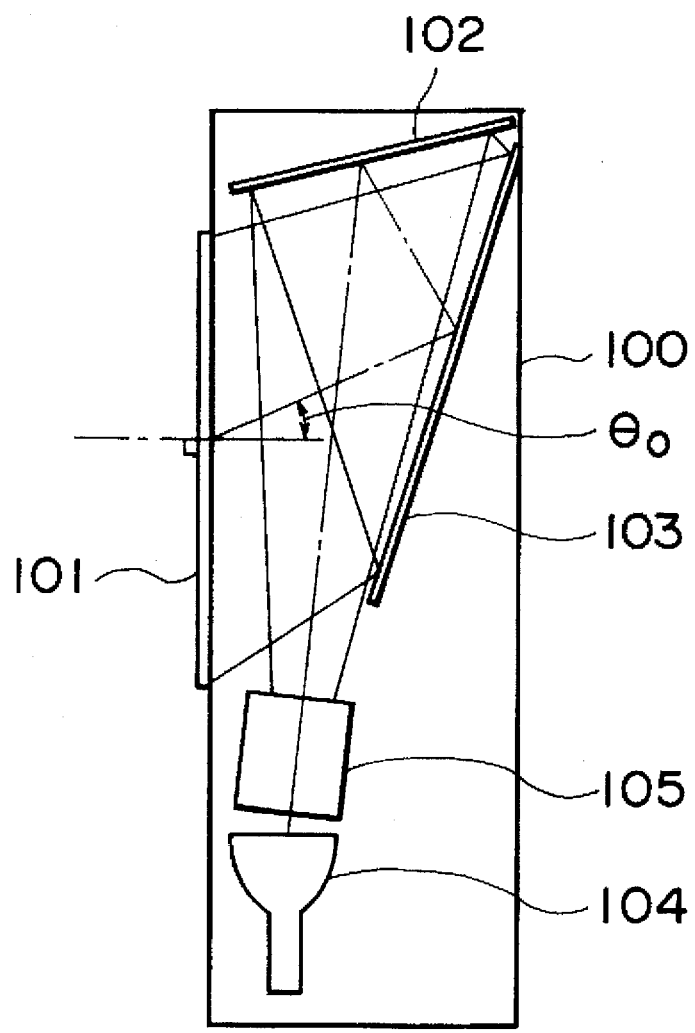
FIG. 5 shows a prior art rear projection type image display device of an oblique incidence system.

FIGS. 4A and 4B shows a third embodiment of the method for manufacturing the eccentric Fresnel lens sheets of the present invention.

The method of manufacturing the eccentric Fresnel lens sheets of the present embodiment is different from that of the first embodiment shown in FIG. 1 in the following aspect.

In the first embodiment, when the second sheets $5_1$ to $5_4$ are cut out from the second concentric Fresnel lens sheet 11, a small area of the fifth sheet (the third sheet 7) may be lost as shown in FIG. 4A depending on the size of the eccentric Fresnel lens sheet. In the present embodiment, the third sheet 7 is cut out from the second concentric Fresnel lens sheet 11, and fourth sheets 8 of the same dimension each having the same shape as that of the lost portion of the third sheet 7 and having the corresponding corners located on the same circle are cut out, instead of the third sheets 7, from other second concentric Fresnel lens sheet 11, and the third sheets 7 and the fourth sheets 8 are bonded for use as the second sheets. As a result, the cut loss of the second concentric Fresnel lens sheet 11 can be reduced.

In the embodiments described above, a number of first sheets and a number of second sheets cut out from a number of concentric Fresnel lens sheets manufactured by the known compression molding method are bonded together to mass-produce the eccentric Fresnel lens sheets. Thus, the mold used in the compression molding method may have concentric Fresnel lens pattern. Further, since the shapes and dimensions of the first sheet and the second sheet are selected to reduce the cut loss of the concentric Fresnel lens sheet, the manufacturing cost of the eccentric Fresnel lens sheet can be reduced.

We claim:

1. A method for mass-producing eccentric Fresnel lens sheets, said method comprising the steps of:

providing a number of concentric Fresnel lens sheets, said concentric Fresnel lens sheets having a first set and a second set each including a plurality of Fresnel lens sheets;

cutting out a plurality of first sheets each corresponding to one portion of the eccentric Fresnel lens sheet from each of the Fresnel lens sheets of the first set;

cutting out a plurality of second sheets each corresponding to the other portion of the eccentric Fresnel lens sheet from each of the Fresnel lens sheets of the second set; and combining each of the first sheets and each of the second sheets in such a manner that patterns on the first sheet and the second sheet are continuous to provide said eccentric Fresnel lens sheet.

2. A method for mass-producing eccentric Fresnel lens sheets according to claim 1 wherein said second set includes a third set and a fourth set, a plurality of third sheets corresponding to said one portion of the eccentric Fresnel lens sheet are cut out from the third set, a plurality of fourth sheets corresponding to said other portion of the eccentric Fresnel lens sheet are cut out from the fourth set, and the third sheets and the fourth sheets are bonded to the first sheets, respectively.

3. A method for mass-producing eccentric Fresnel lens sheets according to claim 1 wherein said first sheets are relatively large rectangular sheets and said second sheets are relatively small rectangular sheets.

4. A method for mass-producing eccentric Fresnel lens sheets according to claim 1 or 2 wherein said first sheets are relatively large pedestal sheets and said second sheets are relatively small triangular sheets.

5. A method for mass-producing eccentric Fresnel lens sheets according to claim 1 or 2 wherein said first sheets have the same pattern and the same shape and dimension.

6. A method for mass-producing eccentric Fresnel lens sheets according to claim 5 wherein said second sheets have the same pattern and have the same shape and dimension.

7. A method for mass-producing eccentric Fresnel lens sheets according to claim 1 wherein said first sheets and said second sheets are cut out not to contain the centers of the concentric Fresnel lens sheets.

8. A method for mass-producing eccentric Fresnel lens sheets according to claim 1 wherein the number of Fresnel lens sheets of said second set is smaller than the number of Fresnel lens sheets of said first set.

9. A method for mass-producing eccentric Fresnel lens sheets each of which does not contain an optical axis, said method comprising the steps of:

providing a number of concentric Fresnel lens sheets, said concentric Fresnel lens sheets including a first set having a plurality of Fresnel lens sheets and a second set having a plurality of Fresnel lens sheets the number of which is less than that of the first set;

cutting out a plurality of first sheets each corresponding to one portion of the eccentric Fresnel lens sheet from each of the Fresnel lens sheets of the first set in such a manner that each of the first sheets does not contain a center of lens of the concentric Fresnel lens sheet;

cutting out a plurality of second sheets, each corresponding to the other portion of the eccentric Fresnel lens sheet from each of the Fresnel lens sheets of the second set in such a manner that each of the second sheets does not contain the center of lens of the concentric Fresnel lens sheet, wherein the number of said second sheets is larger than that of said first sheets and wherein the size of each of said first sheets is larger than the size of each of said second sheets, and combining each of the first sheets and each of the second sheets in such a manner that patterns of the first sheet and the second sheet are continuous to provide said eccentric Fresnel lens sheets.

10. A method for mass-producing eccentric Fresnel lens sheets according to claim 9 wherein said first sheets are rectangular sheets and said second sheets are rectangular sheets.

11. A method for mass-producing eccentric Fresnel lens sheets according to claim 9 wherein said first sheets are pedestal sheets and said second sheets are triangular sheets.

12. A method for mass-producing eccentric Fresnel lens sheets according to claim 9, 10 or 11 wherein said first sheets have the same pattern and the same shape and dimension.

13. A method for mass-producing eccentric Fresnel lens sheets according to claim 12 wherein said second sheets have the same pattern and have the same shape and dimension.

14. A method for mass-producing eccentric Fresnel lens sheets according to claim 9 wherein said second set includes a third set and a fourth set, a plurality of third sheets corresponding to said one portion of the eccentric Fresnel lens sheet are cut out from the third set, a plurality of fourth sheets corresponding to said other portion of the eccentric Fresnel lens sheet are cut out from the fourth set, and the third sheets and the fourth sheets are bonded to the first sheets, respectively.

15. A method for mass-producing eccentric Fresnel lens sheets each of which does not contain an optical axis, said method comprising the steps of:

providing a number of concentric Fresnel lens sheets, said concentric Fresnel lens sheets including a first set having a plurality of Fresnel lens sheets and a second set having a plurality of Fresnel lens sheets the number of which is less than that of the first set;

cutting out a plurality of first sheets each corresponding to one portion of the eccentric Fresnel lens sheet from each of the Fresnel lens sheets of the first set in such a manner that each of the first sheets does not contain a center of lens of the concentric Fresnel lens sheet and the first sheets are of the same shape and dimension to each other;

cutting out a plurality of second sheets, said second sheets being smaller than said first sheets, each of said second sheets corresponding to the other portion of the eccentric Fresnel lens sheet from each of the Fresnel lens sheets of the second set in such a manner that each of the second sheets does not contain the center of lens of the concentric Fresnel lens sheet and the second sheets are of the same shape and dimension to each other, wherein the number of said second sheets is larger than that of said first sheets, and wherein the size of each of said first sheets is larger than the size of each of said second sheets; and combining each of the first sheets and each of the second sheets in such a manner that patterns of the first sheet and the second sheet are continuous to provide said Fresnel lens sheets.

16. A method for mass-producing eccentric Fresnel lens sheets according to claim 15 wherein said second set includes a third set and a fourth set, a plurality of third sheets corresponding to said one portion of the eccentric Fresnel lens sheet are cut out from the third set, a plurality of fourth sheets corresponding to said other portion of the eccentric Fresnel lens sheet are cut out from the fourth set, and the third sheets and the fourth sheets are bonded to the first sheets, respectively.

17. A method for mass-producing eccentric Fresnel lens sheets according to claim 15 wherein said first sheets are relatively large rectangular sheets and said second sheets are relatively small rectangular sheets.

18. A method for mass-producing eccentric Fresnel lens sheets according to claim 15 or 16 wherein said first sheets are relatively large pedestal sheets and said second sheets are relatively small triangular sheets.

19. A method for mass-producing eccentric Fresnel lens sheets according to claim 15 or 16 wherein said first sheets have the same pattern and the same shape and dimension.

20. A method for mass-producing eccentric Fresnel lens sheets according to claim 19 wherein said second sheets have the same pattern and have the same shape and dimension.

21. A method for producing eccentric Fresnel lens sheets, said method comprising the steps of:

providing first and second concentric Fresnel lens sheets;

cutting out a plurality of first sheets each corresponding to one portion of the eccentric Fresnel lens sheet from the first Fresnel lens sheet;

cutting out a plurality of second sheets each corresponding to the other portion of the eccentric Fresnel lens sheet from the second Fresnel lens sheet; and combining each of the first sheets and each of the second sheets in such a manner that patterns on the first sheet and the second sheet are continuous to provide said eccentric Fresnel lens sheets.

\* \* \* \* \*